US007200142B1

(12) United States Patent
Loghmani

(10) Patent No.: US 7,200,142 B1
(45) Date of Patent: Apr. 3, 2007

(54) SYSTEM FOR PROVIDING MULTI-PHASED, MULTI-MODAL ACCESS TO CONTENT THROUGH VOICE AND DATA DEVICES

(75) Inventor: Masoud Loghmani, Crownsville, MD (US)

(73) Assignee: Logic Tree Corporation, Bowie, MD (US)

( * ) Notice: Subject to any disclaimer, the term of this patent is extended or adjusted under 35 U.S.C. 154(b) by 192 days.

(21) Appl. No.: 10/067,968

(22) Filed: Feb. 8, 2002

Related U.S. Application Data

(60) Provisional application No. 60/267,207, filed on Feb. 8, 2001.

(51) Int. Cl.
*H04L 12/66* (2006.01)
*G06Q 99/00* (2006.01)
*H04M 1/64* (2006.01)

(52) U.S. Cl. ............... 370/353; 379/88.17; 705/79

(58) Field of Classification Search ........... 379/88.14, 379/88.17, 88.22; 455/414.1
See application file for complete search history.

(56) References Cited

U.S. PATENT DOCUMENTS

| | | | | |
|---|---|---|---|---|
| 5,291,583 A | | 3/1994 | Bapat .................... 395/500 |
| 5,555,299 A | * | 9/1996 | Maloney et al. ....... 379/212.01 |
| 5,715,314 A | | 2/1998 | Payne et al. .................. 380/24 |
| 5,745,681 A | | 4/1998 | Levine et al. ................ 709/200 |
| 5,745,754 A | | 4/1998 | Lagarde et al. ............ 395/615 |
| 5,761,280 A | | 6/1998 | Noonen et al. .............. 379/93 |
| 5,799,278 A | | 8/1998 | Cobbett et al. ............. 704/232 |
| 5,802,526 A | | 9/1998 | Fawcett et al. ............. 707/104 |
| 5,806,030 A | | 9/1998 | Junqua ....................... 704/245 |
| 5,806,033 A | | 9/1998 | Lyberg ....................... 704/255 |
| 5,809,462 A | | 9/1998 | Nussbaum .................. 704/232 |
| 5,867,816 A | | 2/1999 | Nussbaum .................. 704/232 |
| 5,884,262 A | | 3/1999 | Wise et al. ............... 704/270.1 |
| 5,913,196 A | | 6/1999 | Talmor et al. .............. 704/270 |
| 5,915,001 A | | 6/1999 | Uppaluru ................ 379/88.22 |
| 5,922,045 A | * | 7/1999 | Hanson ....................... 709/206 |

(Continued)

FOREIGN PATENT DOCUMENTS

GB 2 317 070 3/1998

OTHER PUBLICATIONS

Book, Furui, Sadoki; "Digital Speech Processing, Synthesis, and Recognition", Tokyo: Tokai University Press, 1985; Chapter 8, "Speech Recognition", pp. 225-289.

(Continued)

*Primary Examiner*—Fan Tsang
*Assistant Examiner*—Joseph T Phan
(74) *Attorney, Agent, or Firm*—Roylance, Abrams, Berdo & Goodman, L.L.P.

(57) ABSTRACT

A method for accessing content through multiple devices, e.g. Telephone (1) and/or a data device (4) such as a Personal Digital Assistant (PDA) or Web Enabled Mobile Phone, is discussed where a user can initiate interaction with data through any device (mode), and then switch to another mode of interaction without starting over. The discussed method also allows a user to return to the same point in an application where a call session was lost or intentionally disengaged before completion. The user can regain access to the original call session via any telecommunications (voice or non-voice) device. Access can be accomplished whether the device is the same or different from that used for the original session.

14 Claims, 3 Drawing Sheets

U.S. PATENT DOCUMENTS

| | | | |
|---|---|---|---|
| 5,953,392 A | 9/1999 | Rhie et al. | 379/88.13 |
| 5,991,712 A | 11/1999 | Martin | 704/10 |
| 6,016,336 A * | 1/2000 | Hanson | 379/88.23 |
| 6,101,473 A | 8/2000 | Scott et al. | 704/275 |
| 6,134,235 A | 10/2000 | Goldman et al. | 370/352 |
| 6,167,376 A | 12/2000 | Ditzik | 704/231 |
| 6,215,784 B1 * | 4/2001 | Petras et al. | 370/356 |
| 6,240,448 B1 | 5/2001 | Imielinski et al. | 379/90.01 |
| 6,269,336 B1 | 7/2001 | Ladd et al. | 704/270 |
| 6,335,928 B1 | 1/2002 | Herrmann et al. | 370/352 |
| 6,377,927 B1 | 4/2002 | Loghmani et al. | 704/275 |
| 6,539,080 B1 * | 3/2003 | Bruce et al. | 379/88.17 |
| 6,560,456 B1 * | 5/2003 | Lohtia et al. | 455/445 |
| 6,751,453 B2 * | 6/2004 | Schemers et al. | 379/88.14 |
| 6,801,763 B2 * | 10/2004 | Elsey et al. | 455/404.1 |
| 2001/0033564 A1 | 10/2001 | Hickman | 370/352 |

OTHER PUBLICATIONS

Press release, "Programmers Learn to Talk Again with ®Motorola'sVOXML Language", Voice Technology & Services News: Potomac; Oct. 13, 1998, 3 pages extracted from Proquest Database http://proquest.umi.com on Internet on Oct. 17, 2002.

Business Editors/High Tech Writers, "Motorola Introduces Voice Browser Technology for Accessing Web Content from Telephones", Business Wire; New York; Sep. 30, 1998, 3 pages extracted from Proquest Database http://proquest.umi.com on Internet on Oct. 17, 2002.

Cover, Robin, "The XML Cover Pages", Jan. 4, 2001, extracted from Google on Internet on Jan. 19, 2002.

* cited by examiner

SYSTEM FOR PROVIDING MULTI-PHASED, MULTI-MODAL ACCESS TO CONTENT THROUGH VOICE AND DATA DEVICES

This application claims the benefit of U.S. provisional application Ser. No. 60/267,207, filed Feb. 8, 2001.

FIELD OF THE INVENTION

This invention relates to voice and non-voice access to Internet Protocol data. Specifically, the invention relates to a method that reconnects users with their partially completed sessions using phones through voice, display, or other communication device.

BACKGROUND OF THE INVENTION

Various services now provide voice and non-voice access to Internet data. A caller may access a "Voice Portal" or "Voice Site" by simply dialing a number advertised by the company providing the Voice Access service. The caller will hear a greeting that requests the caller to "speak" or "enter" specific commands. As an example, a caller may ask the system to provide him/her with the latest weather information by simply speaking a command, or pressing a DTMF button on the phone. The information provided to the user may be pre-recorded and accessed from a database, or it may be accessed from a page similar to those available on the Internet. The mark-up language used to code the page may be VoiceXML or any other type of XML-based coding language. Some legacy systems may use proprietary or less commonly used methods for connecting the system to back-end data servers.

A dropped call occurs when a call session is disconnected before completion. The reason for session loss can be due to an undesired interruption or by intentional abandonment. The problem is that there are no existing ways to return to the call session that was terminated before completion. Users have to begin new sessions and repeat the steps that they had performed earlier in order to follow a prematurely terminated session through to completion. As an example, a caller is making a purchase on his phone, he selects the merchandise, speaks the shipping and billing address, and then loses the call prior to completing their purchase. In all existing systems, the caller would need to repeating the afore-mentioned steps.

SUMMARY OF THE INVENTION

The present invention allows the caller to call back, identify himself and continue from where the call was dropped. An alternative use is for the caller to start the purchase by making a call, go through multiple steps, and hang up when payment information is requested. He will then switch to a data device (e.g. WAP browser on his phone or a Personal Digital Assistant), and enter the credit card information through the data device.

The present invention also allows the user to go through this process in the reverse order. In other words, the caller could start the process using a WAP browser or a PDA, and then switch to Voice mode.

The present invention allows a caller accessing a data source through a voice call or data device to retain the transaction information in between subsequent access sessions whether access originates from a voice device (e.g. Telephone) or data device (e.g. PDA).

The method is to keep the data session independent of the medium used to access the data. The data for the transaction session resides in the temporary memory of a computer or is saved in a database on the hard drive or other long-term storage media.

The session data is tied to a specific transaction based on identification information for a user. This identification could be accomplished through the use of login/password id, or Caller-ID and Dialed-Number-Identification (DNIS) for phone calls, or cookies for Data devices.

When a caller makes the first call to the system, he will identify himself either automatically or manually before starting any transaction. The present invention will register the identification of the caller along with the session data. Session data is saved in a Session Management Gateway (e.g., such as Session Management Gateway) (7) in FIG. 1) in between each step of the transaction. If the caller hangs up prior to completion of transaction, the session data will not be lost. When the caller calls back, he is identified once again, and his session will be mapped to the existing one. At that point the caller will be able to continue the same transaction from the point where it was cut-off. A caller could re-establish the same transaction from any point regardless of what device is used throughout each phase of the transaction. For example, the user could call back with the same mobile phone (1) used to originate the session or use a different device such as an office phone or PDA.

The reason that this can be accomplished is because the data access session information is separated from the business logic, and is not tied to a specific telephony session or other client interface session. The data interaction session database stores the information for the data layer.

BRIEF DESCRIPTION OF DRAWINGS

The various aspects, advantages and novel features of the present invention will be more readily comprehended from the following detailed description when read in conjunction with the appended drawings, in which.

DETAILED DESCRIPTION OF PREFERRED EMBODIMENTS

Figure 1:
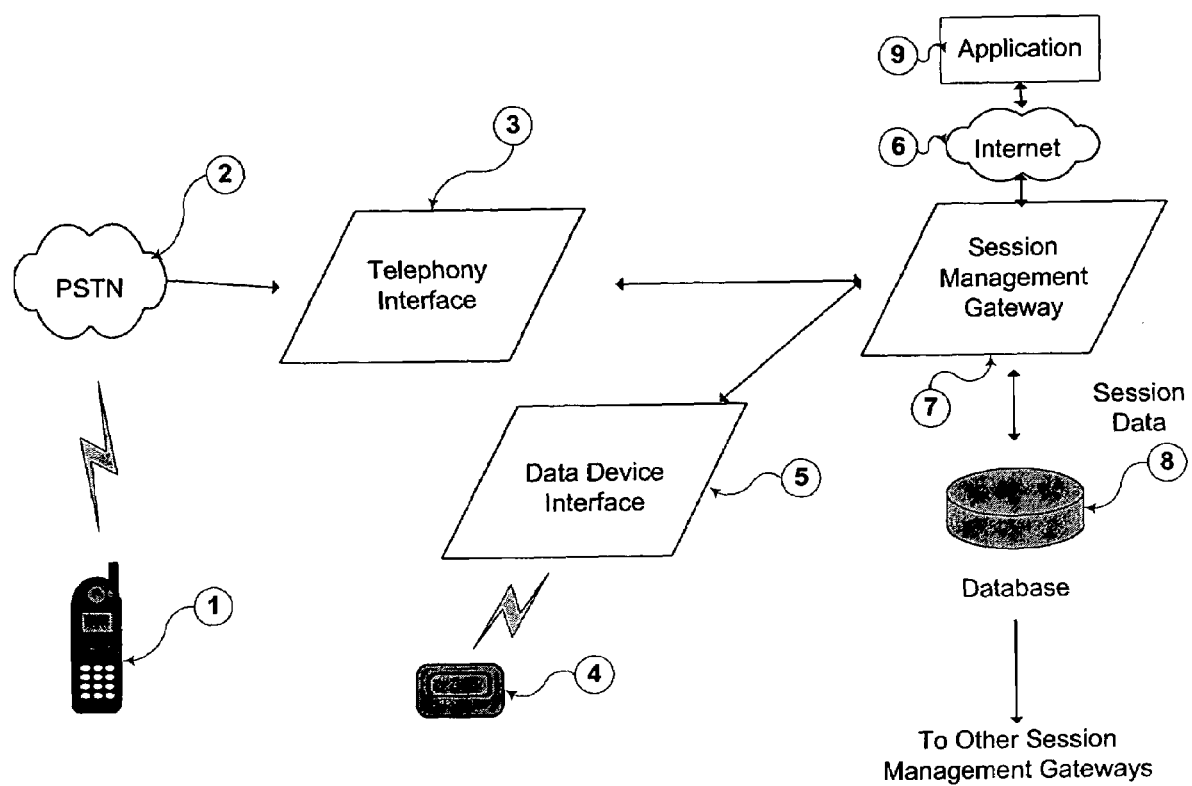
FIG. 1 illustrates a User establishing a session using a mobile phone, hanging up, accessing the same session stored on the database through a Session Management Gateway, and continuing to interact with the application using a data device in accordance with an embodiment of the present invention.
Figure 2:
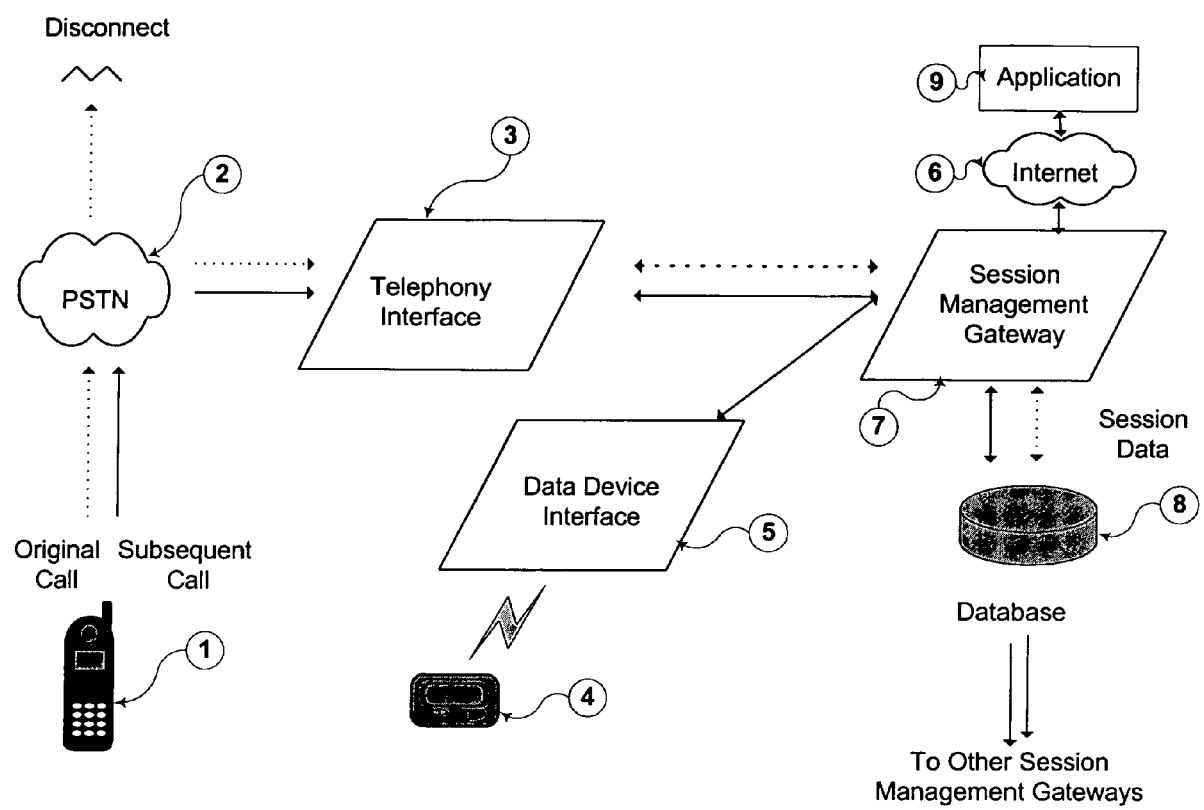
FIG. 2 illustrates a User establishing a session using a mobile phone, losing the call, but calling again, accessing the same session stored on the database through a Session Management Gateway, and continuing to interact with the application using the mobile phone in accordance with an embodiment of the present invention.
Figure 3:
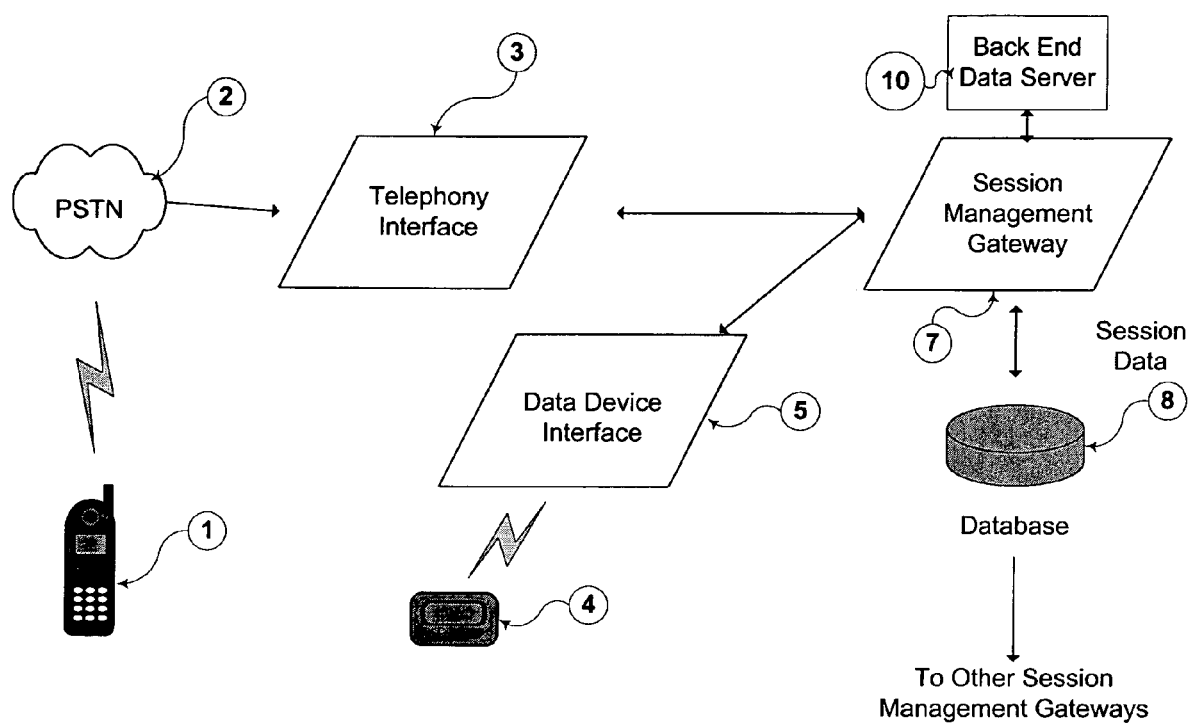
FIG. 3 illustrates a caller accessing a proprietary back end data server instead of an application server through the Session Management Gateway in accordance with an embodiment of the present invention.

With reference to FIGS. 1, 2 and 3, a software-based method is provided in accordance with the present invention to allow a caller to interact with data and applications in multiple phases using multiple devices or a single device. The solution comprises four main components, that is,
  a Session Management Gateway (7) capable of interacting with an application (9) from the one side (i.e., using standard Internet protocols for connection to Internet based applications) and multiple client interfaces such as a Telephone Interface (3) or a Data Device interface (5) from the other side, and also capable of maintaining the transaction session with the Application (9) separate from interaction sessions with client devices, and capable of maintaining the interaction session with the application (9) in a database (8) even if no client device is connected at that moment to the session pertaining to the said transaction.

- a Data Device Interface capable of interacting with data devices equipped with display, keyboard, sound interface, location sensor, etc. Data device may have any combination of one or more human or machine data sources which can relay user input (e.g. a keyboard) or produce data automatically (e.g. a location sensor) as well as modules which can present data (e.g. a display that shows the data to a human, or a relay that uses the data to control an engine).
- a Telephony Interface that allows callers to access their sessions using any type of voice interface devices (e.g. a mobile phone (1)), and is capable of presenting the data to the user in audible fashion, and also capable of collecting input from the user in spoken fashion (spoken commands) as well as other forms such as DTMF input.
- A Database (8) which maintains transaction sessions controlled by Session Management Gateway (7).

An important aspect of the Session Management Gateway (7) is that it associates each transaction session with a user. A user may be identified by any number of mechanisms such as a pin and password combination that is entered upon accessing the system, or a cookie that is offered to the system once the user data device (4) access the system, or Caller-Id information. When a user accesses the system for the first time, the Session Management Gateway (7) creates a transaction session for the user, and associates user's identification data with the transaction session that was created for that user. Transaction session is stored in a database (8) which may reside in the memory of the computer running Session Management Gateway (7), or on the hard-drive of the same machine, or on a different machine connected to the said computer via a local area network.

If the user is disconnected from the system without completing the application, the transaction session is kept in the database for a pre-determined period of time. If the user does not connect to the system within the pre-defined period, the session data will be removed. However if the caller connects to the system within the pre-defined period of time, caller will be connected to the same transaction session, and he can continue interacting with the application (9).

In accordance with another aspect of the present invention, the caller may reconnect to the system using a different device than the one used to establish the original connection, as shown in FIG. 2.

In accordance with yet another aspect of the present invention, the Session Management Gateway (7) may handle a multiplicity of transaction sessions at any time.

In accordance with another aspect of the present invention, the software solution may be implemented using only one client interface (e.g. only Telephony Interface (3)), one Session Management Gateway (7), and a database (8).

In accordance with yet another aspect of the present invention, a caller may access a proprietary back end data server (10), as shown in FIG. 3, instead of an application server (9) through Session Management Gateway (7).

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A software-based method that allows users to access an information site or an application site on the internet by one or more client devices comprising a telephone, a mobile phone and a data device, the method comprising the steps of:

performing a transaction session by accessing a data source in multiple phases, the data source comprising at least one of the information site and the application site, the transaction session comprising at least one client interaction session and a data source interaction session, the client interaction session comprising a data access session with the client device, the data source interaction session comprising a session corresponding to the data source, the multiple phases comprising different client interaction sessions via the one or more client devices to participate in at least part of the transaction session;

storing session data relating to the transaction session in a memory device, the session data comprising user identification data for associating the transaction session to a user participating in the transaction session, the session data being saved at different steps of the transaction session; and using the stored session data to allow the user to drop a call constituting one of the multiple phases, and call back at a later time to continue the transaction session with one of the information site and the application site during another one of the multiple phases;

wherein the storing step comprises the step of storing session data in a memory device corresponding to a session management gateway connected downstream of the information site or the application site via the internet and upstream of the client devices;

wherein the session data is retained in the memory device even during the absence of the user device being connected to the session management gateway;

wherein the session management gateway maintains the transaction session with the data source for a selected period of time after a client interaction session between the information site or the application site and a user device is terminated before completion, and the session management gateway maps a subsequent client interaction session to the transaction session.

2. A method as claimed in claim 1, wherein the session data allows the user to continue the transaction session at substantially the same point during the transaction session where the call was earlier dropped or data contact was terminated.

3. A method as claimed in claim 1, wherein the storing step comprises the step of storing the session data in the memory device independently of the information site, the application site, business logic employed upstream of the session management gateway, a back end data server, the client device, and the access medium employed by the client device to establish an interaction session to access the session management gateway.

4. A method as claimed in claim 1, wherein a user initiates the subsequent client interaction session to continue the transaction session and provides the same user identification data.

5. A system for managing access of a client device to a data source comprising at least one of an information site and an application site on the internet comprising:
- a session management gateway connected downstream of the data source via the internet and upstream of a client device; and
- a memory device read from and written to by the session management gateway and not by a user interface module, nor the client device, nor a back end data server, nor the data source;
- wherein the session management gateway is programmable to store transaction session data in the memory device that relates the user to a transaction session with the data source;
- the transaction session comprising at least one client interaction session and a data source interaction session;
- the client interaction session comprising a data access session with the client device;
- the data source interaction session comprising a session corresponding to the data source;
- the transaction session data being stored independently of the information site, the application site, the business logic, a back end data server, the client device, and the access medium employed by the client device to establish an interaction session to access the session management gateway for participation in the transaction session;
- the session management gateway being configured to associate user identification data corresponding to the user with the transaction session data for that user, and to map any subsequent interaction sessions initiated by the user using the client device or another device with the transaction session by using the user identification data after the user has identified himself;
- wherein the transaction session data is retained in the memory device even during the absence of the client device being connected to the session management gateway;
- wherein the session management gateway maintains the transaction session with the data source for a selected period of time after an client interaction session between the data source and a client device is terminated before completion, and the session management gateway maps a subsequent client interaction session to the transaction session.

6. A system as claimed in claim 5, wherein users access the system multi-modally using a plurality of different devices during respective ones of the multiple phases of interaction.

7. A system, as claimed in claim 5, wherein each user accessing the system is identified using at least one of a combination of username and password, a pin and passcode, cookie information, and other identification technique available through the use of the client device.

8. A system as claimed in claim 5, wherein the data source comprises a single application and the session management gateway interacts with the single application for the transaction session, and the system is operable to support multiple phases with respect to the transaction session, the multiple phases comprising different client interaction sessions via the one or more client devices to participate in at least part of the transaction session, the client device being a telephone in one phase, and a data device in another phase.

9. A system as claimed in claim 5, wherein the session management gateway is operable to store transaction session data corresponding to plural transaction sessions in the memory device independently of the information site, the application site, a back end data server, the business logic, the client device, and the access medium employed by the client device to establish an interaction session to access the session management gateway to avoid being application-specific.

10. A system as claimed in claim 5, wherein the transaction session data is retained in the memory device a predetermined period of time and then deleted therefrom if no other phases or client interaction sessions are commenced during the predetermined period of time.

11. A system as claimed in claim 5, wherein the transaction session data is saved to the memory device at different events in the transaction.

12. A system as claimed in claim 5, further comprising at least one other session management gateway being configured to access the memory device and to store transaction session data therein.

13. A system as claimed in claim 12, wherein the session management gateways connected to the memory device are operable to maintain respective phases comprising client interaction sessions in the same transaction session.

14. A system as claimed in claim 5, wherein the data source comprises a single application and the session management gateway interacts with the single application for the transaction session, and the system is operable to support multiple phases with respect to the transaction session, the multiple phases comprising different client interaction sessions via the one or more client devices to participate in at least part of the transaction session, the client device being a data device in one phase, and a data device in another phase.

* * * * *